US007846268B2

(12) United States Patent
Smets et al.

(10) Patent No.: US 7,846,268 B2
(45) **Date of Patent: *Dec. 7, 2010**

(54) WHITENESS PERCEPTION COMPOSITIONS COMPRISING A DYE-POLYMER CONJUGATE

(75) Inventors: Johan Smets, Lubbeek (BE); Andre Baeck, Bonheiden (BE); Jean-Luc Bettiol, Brussels (BE); Mark Robert Sivik, Mason, OH (US); Neil Joseph Lant, Newcastle upon Tyne (GB); James Robert Lickiss, Northumberland (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,347

(22) Filed: Feb. 1, 2010

(65) Prior Publication Data

US 2010/0132134 A1 Jun. 3, 2010

Related U.S. Application Data

(63) Continuation of application No. 11/270,273, filed on Nov. 9, 2005, now Pat. No. 7,686,892.

(60) Provisional application No. 60/691,035, filed on Jun. 16, 2005, provisional application No. 60/674,142, filed on Apr. 22, 2005, provisional application No. 60/645,869, filed on Jan. 20, 2005, provisional application No. 60/634,857, filed on Dec. 10, 2004, provisional application No. 60/629,528, filed on Nov. 19, 2004.

(51) Int. Cl.
*B08B 3/04* (2006.01)
*C09B 62/00* (2006.01)
*C11D 3/22* (2006.01)
*C11D 3/37* (2006.01)
*C11D 3/40* (2006.01)

(52) U.S. Cl. ......................... 134/42; 510/276; 510/302; 510/324; 510/334; 510/473; 510/475; 510/507; 8/543; 8/137

(58) Field of Classification Search ................. 510/276, 510/302, 324, 334, 473, 475, 507; 8/543, 8/137; 134/42

See application file for complete search history.

(56) References Cited

U.S. PATENT DOCUMENTS

| | | | | |
|---|---|---|---|---|
| 3,284,441 | A | 11/1966 | Bishop et al. | |
| 3,597,304 | A | 8/1971 | Baldwin et al. | |
| 4,430,243 | A | 2/1984 | Bragg | |
| 4,457,855 | A | 7/1984 | Sudbury et al. | |
| 4,737,156 | A | 4/1988 | Tambor et al. | |
| 5,308,808 | A | 5/1994 | Gregar et al. | |
| 5,318,714 | A | 6/1994 | Markussen et al. | |
| 5,463,036 | A | 10/1995 | Kniewske et al. | |
| 5,486,303 | A | 1/1996 | Capeci et al. | |
| 5,489,392 | A | 2/1996 | Capeci et al. | |
| 5,516,448 | A | 5/1996 | Capeci et al. | |
| 5,565,422 | A | 10/1996 | Del Greco et al. | |
| 5,569,645 | A | 10/1996 | Dinniwell et al. | |
| 5,574,005 | A | 11/1996 | Welch et al. | |
| 5,576,282 | A | 11/1996 | Miracle et al. | |
| 5,595,967 | A | 1/1997 | Miracle et al. | |
| 5,597,936 | A | 1/1997 | Perkins et al. | |
| 5,691,297 | A | 11/1997 | Nassano et al. | |
| 5,770,552 | A * | 6/1998 | Bruhnke | 510/343 |
| 5,879,584 | A | 3/1999 | Bianchetti et al. | |
| 5,972,049 | A | 10/1999 | Wicker, Jr. et al. | |
| 6,225,464 | B1 | 5/2001 | Hiler, II et al. | |
| 6,248,710 | B1 | 6/2001 | Bijsterbosch et al. | |
| 6,306,812 | B1 | 10/2001 | Perkins et al. | |
| 6,326,348 | B1 | 12/2001 | Vinson et al. | |
| 6,475,980 | B2 | 11/2002 | Bijsterbosch et al. | |
| 6,579,842 | B2 | 6/2003 | Howell et al. | |
| 6,586,384 | B2 | 7/2003 | Hemmington et al. | |
| 6,685,748 | B1 | 2/2004 | Day et al. | |
| 6,734,299 | B1 | 5/2004 | Clark et al. | |
| 7,534,755 | B2 * | 5/2009 | Boutique et al. | 510/276 |
| 7,686,892 | B2 * | 3/2010 | Smets et al. | 134/42 |
| 2006/0111264 | A1 | 5/2006 | Smets et al. | |

FOREIGN PATENT DOCUMENTS

| | | | |
|---|---|---|---|
| CA | 1 170 256 A1 | 7/1984 | |
| EP | 0 251 446 B1 | 12/1994 | |
| EP | 1 317 917 A | 6/2003 | |
| GB | 948678 | 2/1964 | |
| JP | 10-007957 A | 1/1998 | |
| WO | WO 91/06637 A1 | 5/1991 | |
| WO | WO 95/10591 A1 | 4/1995 | |

(Continued)

OTHER PUBLICATIONS

Journal of Chromatography 1980, 192, pp. 275-293.

(Continued)

*Primary Examiner*—Brian P Mruk
(74) *Attorney, Agent, or Firm*—James F. McBride; Leonard W. Lewis

(57) ABSTRACT

The present invention relates to cleaning and/or treatment compositions comprising a dye conjugate, and processes of making and using such compositions. Such compositions can provide benefits such as an increase in the whiteness or blackness perception of a situs that is cleaned or treated with such compositions.

23 Claims, No Drawings

FOREIGN PATENT DOCUMENTS

| | | | | |
|---|---|---|---|---|
| WO | WO 95/30042 | A1 | | 11/1995 |
| WO | WO 98/00500 | A1 | | 1/1998 |
| WO | WO 98/17767 | A1 | | 4/1998 |
| WO | WO 98/29528 | A2 | | 7/1998 |
| WO | WO 99/00477 | | * | 1/1999 |
| WO | WO 99/00477 | A1 | | 1/1999 |
| WO | WO 99/09124 | A1 | | 2/1999 |
| WO | WO 99/14245 | A1 | | 3/1999 |
| WO | WO 99/20727 | A1 | | 4/1999 |
| WO | WO 00/18862 | A1 | | 4/2000 |
| WO | WO 00/32601 | A2 | | 6/2000 |
| WO | WO 04/000948 | A | | 12/2003 |

OTHER PUBLICATIONS

Polymer Degradation and Stability 56 (1997) 331-337 ASTM Method D 1439-03.

Dyes & Paints: A Hands-On Guide to Coloring Fabric by Elin Noble, Publisher: Martingale and Company; (Mar. 1, 1998) ASIN 15677102 pp. 33 through 45.

The Basic Guide to Dyeing & Painting Fabric by Cindy Walter and Jennifer Priestley Publisher: Krause Publications, Bk&Access edition (Mar. 1, 2002) ISBN: 0873493346 pp. 16 and 20 through 34.

L. Ho Tan Tai in "Formulating Detergents and Personal Care Products: A Complete Guide to Product Development", AOCS press, Champaign 2000, pp. 122-137.

International Search Report, Mar. 10, 2006.

* cited by examiner

WHITENESS PERCEPTION COMPOSITIONS COMPRISING A DYE-POLYMER CONJUGATE

CROSS-REFERENCES TO RELATED APPLICATIONS

This application is a continuation of and claims priority under 35 U.S.C. §120 to U.S. application Ser. No. 11/270,273, filed Nov. 9, 2005, (now issued U.S. Pat. No. 7,686,892 B2), which in turn claims priority under 35 U.S.C. §119(e) to U.S. Provisional Application Ser. No. 60/691,035 filed Jun. 16, 2005; U.S. Provisional Application Ser. No. 60/674,142 filed Apr. 22, 2005; U.S. Provisional Application Ser. No. 60/645,869 filed Jan. 20, 2005; U.S. Provisional Application Ser. No. 60/634,857 filed Dec. 10, 2004; and U.S. Provisional Application Ser. No. 60/629,528 filed Nov. 19, 2004.

FIELD OF THE INVENTION

The present invention relates to a cleaning and/or treatment compositions comprising a dye conjugate, and processes of making and using such compositions.

BACKGROUND OF THE INVENTION

Consumers prefer that articles, such as garments, maintain their initial color throughout the lifecycle of the article—even when such articles are repeatedly washed or cleaned. For example, it is preferred that white surfaces remain white as such color is associated with the cleanliness. However, the perception of color, in particular "whiteness" varies amongst consumers and is believed to result from the interaction of a number of parameters that include the cultural color associations of the observer. For example, Egyptian and Mexican consumers typically perceive a blue hue as white, while Indian consumers typically perceive a violet pinkish hue as white. In addition, while certain dyes may improve the whiteness perception of a situs, when employed in a cleaning and/or treatment compositions, such dyes deposit inefficiently and/or build up on a cleaned or treated situs. As a result, the whiteness perception of such situs may in fact be decreased due to discolouration that is believed to be caused by dye build up. While several techniques have been used to increase the efficiency of deposition of materials (See for example WO 2000/18862, WO 99/14245, WO 98/29528, WO 98/00500, WO 95/30042, U.S. Pat. No. 6,579,842, U.S. Pat. No. 6,586,384, U.S. Pat. No. 5,972,049, U.S. Pat. No. 3,597,304, GB 948678) there remains a need for cleaning and/or treatment compositions that can provide tailored color perceptions, such as "whiteness" or "blackness" without the negatives associated with dye build-up.

SUMMARY OF THE INVENTION

The present invention relates to a cleaning and/or treatment compositions comprising a dye conjugate, and processes of making and using such compositions.

DETAILED DESCRIPTION OF THE INVENTION

Definitions

As used herein, the term "cleaning composition" includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, mouthwashes, denture cleaners, car or carpet shampoos, bathroom cleaners; hair shampoos and hair-rinses; shower gels and foam baths and metal cleaners; as well as cleaning auxiliaries such as bleach additives and "stain-stick" or pre-treat types.

As used herein, the term "situs" includes paper products, fabrics, garments and hard surfaces.

As used herein, the term "polymer" encompasses oligomers.

As used herein, the articles a and an when used in a claim, are understood to mean one or more of what is claimed or described.

As used herein, "reactive dye" means a dye comprising at least one chromophore, said dye being capable of attaching to a hydroxy, an amino or a mercapto group of a substrate via a covalent bond.

As used herein, "basis/cationic dye" means a dye comprising at least one chromophore, said at least one chromophore being part of the positive ion of said dye.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Cleaning and/or Treatment Compositions

It has been surprisingly found that dye conjugates can be used to at least partially coat a situs and that such coating can, at least in part, be readily stripped from the situs. Thus, when one or more of such dye conjugates are employed in a cleaning and/or fabric treatment composition, dye can be efficiently and uniformly deposited and readily removed. In addition, it is believed that dirt and soil adhere to such coating rather than the situs. Thus, when such coating is stripped, dirt and residual dye are removed and the negatives associated with dye build-up are mitigated. As a result, the colour perception of a treated situs, for example the whiteness or blackness, can be dramatically improved.

In a first aspect of Applicants' invention, Applicants' invention includes cleaning and/or treatment compositions comprising at least 0.0001 weight percent of a material selected from a dye polymer conjugate that may optionally comprise salts such as sulfates, phosphates, carbonates, and/or halides, a dye clay conjugate and mixtures thereof, and an optional stripping agent, any balance of said compositions being one or more adjunct materials.

In a second aspect of Applicants' invention, Applicants' invention includes cleaning and/or treatment compositions comprising from about 0.0001 to about 20 weight percent, from about 0.0001 to about 10 weight percent, from about 0.001 to about 1 weight percent of said dye polymer conjugate and/or from about 1 to about 50 weight percent, or even from about 5 to about 15 weight percent of a dye clay conjugate, and an optional stripping agent, any balance of said compositions being one or more adjunct materials.

In said first and second aspects of Applicants' invention, said dye polymer conjugate may be selected from the group consisting of dye polymer conjugates comprising at least one reactive dye and a polymer selected from the group consisting of polymers comprising a moiety selected from the group consisting of a hydroxyl moiety, a primary amine moiety, a secondary amine moiety, a thiol moiety and combinations thereof; and dye clay conjugates comprising at least one cationic/basic dye and a smectite clay.

In said first and second aspects of Applicants' invention, said dye polymer conjugate may be selected from the group consisting of dye polymer conjugates comprising at least one reactive dye selected from the group consisting of reactive dyes CI Reactive Yellow 1 through 213, CI Reactive Orange 1 through 139, CI Reactive Red 1 through 279, CI Reactive Violet 1 through 47, CI Reactive Blue 1 through 273, CI Reactive Green 1 through 33, CI Reactive Brown 1 through 50, CI Reactive Black 1 through 50 and a polymer selected from the group consisting of polysaccharides, proteins, polyalkyleneimines, polyamides, polyols, silicones; and dye clay conjugates comprising at least one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11 and a clay selected from the group consisting of Montmorillonite clay, Hectorite clay, Saponite clay and mixtures thereof.

In said first and second aspects of Applicants' invention, said dye polymer conjugate may be selected from the group consisting of dye polymer conjugates comprising at least one reactive dye selected from the group consisting of reactive dyes C.I. Reactive Violet 1, 2, 4, 5, 22, 46; C.I. Reactive Blue 2, 4, 5-8, 10, 13, 15, 19, 21, 27, 28, 36, 40, 49, 50, 69, 74, 81, 94, 109; C.I. Reactive Red 1-4, 6-9, 12, 13, 17, 22, 24, 33, 35, 41, 43, 45, 58, 66, 83, 84, 88, 92, 96, 120, 125; C.I. Reactive Green 1, 8, 19; C.I. Reactive Black 5, 39 and 45 and a polymer selected from the group consisting of polysaccharides, proteins, polyalkyleneimines, polyamides, polyols, silicones; and dye clay conjugates comprising at least one cationic/basic dye selected from the group consisting of C.I. Basic Red 1, 2, 5, 9, 12, 13, 14, 15, 18, 22, 24, 27, 29, 30, 39, 45, 46, 76; C.I. Basic Violet 1, 2, 3, 4, 6, 7, 10, 11, 14, 16, 18, 21; C.I. Basic Blue 1, 3, 5, 7, 9, 11, 12, 14, 20, 22, 24, 41, 45, 47, 54, 55, 56, 57, 65, 67, 99, 162; and Basic Green 1 and 4; C.I. Basic Black 1, 2 and 7, and a clay selected from the group consisting of Montmorillonite clay, Hectorite clay, Saponite clay and mixtures thereof.

In said first and second aspects of Applicants' invention, said dye polymer conjugate may be selected from the group consisting of dye polymer conjugates comprising at least one dye selected from the group consisting of C.I. Reactive Blue 19, C.I. Reactive Blue 8, C.I. Reactive Blue 10, C.I. Reactive Blue 21, C.I. Reactive Blue 28, C.I. Reactive Violet 22, C.I. Reactive Green 1, C.I. Reactive Red 1, C.I. Reactive Black 5 and a polymer selected from the group consisting of cellulose ethers such as carboxymethyl cellulose including salts thereof such as sodium salt, methyl cellulose, hydroxyalkylcelluloses such as hydroxyl ethyl cellulose, and mixed ethers such as methyl hydroxyethylcellulose, methyl hydroxypropylcellulose, methyl carboxymethyl cellulose; fatty ester modified celluloses; phosphorylated celluloses such as those disclosed in WO 99/09124; cellulose, cationic starch, guar gum, uncharged starch; and dye clay conjugates comprising at least one dye selected from the group consisting of C.I. Basic Red 1, 14, 18; C.I. Basic Violet 1, 3, 10, 16; C.I. Basic Blue 1, 3, 7, 9, 22; C.I. Basic Green 1 and 4; and C.I. Basic Black 2, and a clay selected from the group consisting of Montmorillonite clay, Hectorite clay, Saponite clay and mixtures thereof.

In said first and second aspects of Applicants' invention, said dye polymer conjugate may be selected from the group consisting of C.I. Reactive Blue 19 carboxymethyl cellulose conjugate, C.I. Reactive Blue 19 cellulose conjugate, C.I. Reactive Blue 19 cationic starch conjugate, C.I. Reactive Blue 8 carboxymethyl cellulose conjugate, C.I. Reactive Blue 10 carboxymethyl cellulose conjugate, C.I. Reactive Blue 21 carboxymethyl cellulose conjugate, C.I. Reactive Blue 28 carboxymethyl cellulose conjugate, C.I Reactive Blue 19 guar gum conjugate, C.I. Reactive Violet 22 carboxymethyl cellulose conjugate, C.I. Reactive Violet 22 uncharged starch conjugate, C.I Reactive Violet 22 cationic starch conjugate, C.I. Reactive Violet 22 guar gum conjugate, C.I Reactive Violet 22 hydroxyl ethyl cellulose conjugate, C.I. Reactive Green 1 carboxymethyl cellulose conjugate, C.I. Reactive Red 1 carboxymethyl cellulose conjugate, C.I. Reactive Red 1 uncharged starch, C.I. Reactive Black 5 carboxymethyl cellulose conjugate and mixtures thereof; and said dye clay conjugate may be selected from the group consisting of Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

When a conjugate's polymer component comprises a cellulose ether, such as carboxymethyl cellulose, such cellulose ether may have one or more of the following properties: a weight average molecular weight of less than 1,000,000 Daltons, from about 20,000 Daltons to about 500,000 Daltons, from about 20,000 Daltons to about 180,000 Daltons or even from about 30,000 Daltons to about 120,000 Daltons; a degree of ether substitution, for example, carboxymethylation of from about 0.3 to about 1.2 or even from about 0.4 to about 0.8, said substitution being blocky or random; and a dye substitution ratio of from about 1:10 to about 1:50 or even from about 1:20 to about 1:30. The aforementioned cellulose ether, such as carboxymethyl cellulose, may be degraded by a method selected from the group consisting physical degradation, chemical degradation, enzymatic degradation and mixtures thereof. Suitable methods of chemical degradation include oxidative degradation, for example via hydrogen peroxide treatment. Suitable methods of enzymatic degradation include treatment with an enzyme such as cellulase. If the cellulose ether is degraded, in one aspect of the invention such degradation may occur after ether substitution but prior to dye substitution. Weight average molecular weight is determined according to the general procedure detailed in the Journal of Chromatography 1980, 192, pages 275-293 or Polymer Degradation and Stability 56 (1997) 331-337; degree of ether substitution, and degree of carboxymethylation which is a subset of degree of ether substitution, is determined according to ASTM Method D 1439-03 and the dye substitution is determined by combustion analysis.

In said first and second aspects of Applicants' invention, said optional stripping agent may be present at a level of at least 0.0001 weight percent, from about 0.0001 to about 10 weight percent, from about 0.0001 to about 2 weight percent, or even from about 0.001 to about 0.1 weight percent. Said optional stripping agent may be selected from the group consisting of enzymes, zwitterionic polymers, nonionic surfactants, singlet oxygen generators, transition metal catalysts, per-acid/organic catalysts and mixtures thereof. Suitable enzymes typically include any enzyme that is suitable for use in the subject cleaning and/or treatment composition. Such enzymes include proteases or carbohydrases that are suitable for use in neutral or alkaline solutions. Suitable enzymes may be of animal, vegetable or microbial origin and include chemically or genetically modified variants. Suitable proteases include serine proteases, such as EC 3.4.21 serine endoproteases, trypsin proteases and trypsin-like proteases. Additional examples of suitable proteases include alkaline proteases derived from Bacillus, e.g. subtilisin Novo, subtilisin Carlsberg, subtilisins 309, 147 and 168, including variants from these backbones. Commercial examples of suitable enzymes include Savinase®, Alcalase®, Esperase®, Everlase®, Kannase® and Purafect®, Purafect OX®, Purafect MA®, Properase®. Additional suitable enzymes include BLAP protease and its variants as well as the proteases described in EP 0 251446, WO 91/06637, WO 95/10591 and WO 99/20727. Suitable carbohydrases include enzymes that degrade O-glycosyl bonds in homo and heteropolysaccharides such as celluloses, starches, xylans, (galacto)mannans, pectins, alginates, (arabino)galactans, gums, etc. Examples of such enzymes include neutral or alkaline enzymes hydrolysing o-glycosyl compounds, i.e. EC 3.2.1. enzymes such as (alpha)amylases, (hemi)cellulases, pectate hydrolases, pectin lyases, mannanases, xylanases, arabinases, xylanases, xyloglucanases and Endo EC 3.2.1 enzymes. Commercial examples of suitable enzymes include Natalase®, Termamyl®, Duramyl®, BAN®, Fungamyl®, Stainzyme®, Purastar®, Purafect OXAM® Carezyme®, Celluzyme®, Endolase®, Mannaway®, Purabrite®, Pectawash® and Pectaway®.

Dye Conjugates

Dye conjugates include materials wherein a dye and a conjugating material, for example a polymer or clay, are chemically and/or physically bound together. Such dye conjugates may be chosen based on a number of characteristics including, the dye and/or dye conjugate's charge, the dye's light fastness and/or sensitivity to stripping agents, polymer molecular weight and other detergent ingredients. In certain embodiments of Applicants' invention, the dye conjugate may be chosen such that an optional stripping agent is not required.

Suitable dye to conjugate weight ratios include from about 5:1 to about 1:10 or even from 5:1 to about 1:1000.

Suitable dye conjugates may be obtained from Megazyme International Ireland Ltd. Bray Business Park, Bray, Co. Wicklow, Ireland (for example, Azo-CM-Cellulose) or produced in accordance with the teachings of Applicants' specification/examples or the teachings of the following documents: Dyes & Paints: A Hands-On Guide to Coloring Fabric by Elin Noble, Publisher: Martingale and Company; (Mar. 1, 1998) ASIN: 1564771032 pages 33 through 45 and/or The Basic Guide to Dyeing & Painting Fabric by Cindy Walter and Jennifer Priestley Publisher: Krause Publications; Bk&Acces edition (Mar. 1, 2002) ISBN: 0873493346 pages 16 and 20 through 34.

Suitable dyes, polymeric materials and clays for producing suitable dye conjugates include the dyes, polymeric materials and clays detailed in the Cleaning and/or Treatment Compositions section of the present application. Suitable dyes may be obtained from Askash Chemicals & Dyestuffs Inc. 561 Mitchell Road, Glendale Heights, Ill. 60139 USA; DyStar GmbH & Co. Deutschland KG Industriepark Hoechst, 65926 Frankfurt, Germany; Classic Dyestuff Inc. PO Box 2368, High Point, N.C. 27261 USA; BASF Aktiengesellschaft, Global Business Management Performance Chemicals for Textiles, EVT, 67056 Ludwigshafen, Germany. Suitable polymeric materials may be obtained from Noviant Delta 1P, Business Park Ijsseloord, 2 P.O. Box 2016, NL-6802 CA Arnhem, Netherlands; National Starch and Chemical, 10 Finderne Avenue Bridewater, N.J. 08807-3300 U.S.A; Croda Colloids Ltd, Foundry Lane Ditton Widnes Cheshire WA8 8UB England; Hercules Incorporated, 1313 North Market Street, Wilmington, Del. 198-0001 USA; Suitable smectite clays may be obtained from Colin Stuart Minchem, Weaver Valley Road, Winsford Cheshire CW7 3BU, England (e.g. Quest Bentonite); Laviosa Chimica Via Leonardo da Vinci 21, 57123 Livorno, Italy (e.g. Detercals); Sued Chemie Ostenriederstrasse 15, 85368 Moosburg, Germany (e.g. Laundrosil); Southern Clay Products, 1212 Church Street, Gonzale, Tex. 78629 USA (e.g. Gelwhite and Laponite clays); Elementis Specialties, 329 Wyckoofs Mill Road, 329 Hightstown, N.J. 08520 USA (e.g. Bentone EW).

Adjunct Materials

While not essential for the purposes of the present invention, the non-limiting list of adjuncts illustrated hereinafter are suitable for use in the instant compositions and may be desirably incorporated in certain embodiments of the invention, for example to assist or enhance cleaning performance, for treatment of the substrate to be cleaned, or to modify the aesthetics of the cleaning composition as is the case with perfumes, colorants, dyes or the like. It is understood that such adjuncts are in addition to the dye conjugate and optional stripping agent components of Applicants' compositions. The precise nature of these additional components, and levels of incorporation thereof, will depend on the physical form of the composition and the nature of the cleaning operation for which it is to be used. Suitable adjunct materials include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, structure elasticizing agents, fabric softeners, carriers, hydrotropes, processing aids, solvents and/or pigments. In addition to the disclosure below, suitable examples of such other adjuncts and levels of use are found in U.S. Pat. Nos. 5,576,282, 6,306,812 B1 and U.S. Pat. No. 6,326,348 B1 that are incorporated by reference.

As stated, the adjunct ingredients are not essential to Applicants' compositions. Thus, certain embodiments of Applicants' compositions do not contain one or more of the following adjuncts materials: surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, structure elasticizing agents, fabric softeners, carriers, hydrotropes, processing aids, solvents and/or pigments. However, when one or more adjuncts are present, such one or more adjuncts may be present as detailed below:

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine;

(2) hydrophobic and hydrophilic peracids having the formula R—(C═O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps;

(4) bleach activators having R—(C═O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS.

When present, the peracid and/or bleach activator is generally present in the composition in an amount of from about 0.1 to about 10 wt %, from about 0.5 to about 7 wt % or even from about 0.6 to about 4 wt % based on the composition. One or more hydrophobic peracids or precursors thereof may be used in combination with one or more hydrophilic peracid or precursor thereof.

As the inventors discovered that the fabric hue delivered by the present invention may be strengthened when a hydrophobic peracid is employed in the cleaning compositions of the present invention, in one aspect of such invention such cleaning compositions may comprise a pre-formed peracid; a peracid formed in situ from the reaction of the hydrogen peroxide source and a bleach activator; and mixtures thereof. In another aspect of the invention, such cleaning compositions may comprise a peracid formed in situ from the reaction of the hydrogen peroxide source and a bleach activator. Suitable peracids, hydrogen peroxide sources and bleach activators include those peracids, hydrogen peroxide sources and bleach activators described above.

The amounts of hydrogen peroxide source and peracid or bleach activator may be selected such that the molar ratio of available oxygen (from the peroxide source) to peracid is from 1:1 to 35:1, or even 2:1 to 10:1.

Surfactants—The cleaning compositions according to the present invention may comprise a surfactant or surfactant system wherein the surfactant can be selected from nonionic surfactants, anionic surfactants, cationic surfactants, ampholytic surfactants, zwitterionic surfactants, semi-polar nonionic surfactants and mixtures thereof.

The surfactant is typically present at a level of from about 0.1% to about 60%, from about 1% to about 50% or even from about 5% to about 40% by weight of the subject composition.

Builders—The cleaning compositions of the present invention may comprise one or more detergent builders or builder systems. When a builder is used, the subject composition will typically comprise at least about 1%, from about 5% to about 60% or even from about 10% to about 40% builder by weight of the subject composition.

Builders include, but are not limited to, the alkali metal, ammonium and alkanolammonium salts of polyphosphates, alkali metal silicates, alkaline earth and alkali metal carbonates, aluminosilicate builders and polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof.

Chelating Agents—The cleaning compositions herein may contain a chelating agent. Suitable chelating agents include copper, iron and/or manganese chelating agents and mixtures thereof.

When a chelating agent is used, the subject composition may comprise from about 0.1% to about 15% or even from about 3.0% to about 10% chelating agent by weight of the subject composition.

Dye Transfer Inhibiting Agents—The cleaning compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

When present in a subject composition, the dye transfer inhibiting agents may be present at levels from about 0.0001% to about 10%, from about 0.01% to about 5% or even from about 0.1% to about 3% by weight of the composition.

Brighteners—The cleaning compositions of the present invention can also contain additional components that may tint articles being cleaned, such as fluorescent brighteners. Suitable fluorescent brightener levels, based on total cleaning composition weight percent, include lower levels of from about 0.01, from about 0.05, from about 0.1 or even from about 0.2 wt % to upper levels of 0.5 or even 0.75 wt %. Suitable brighteners are described by L. Ho Tan Tai in "Formulating Detergents and Personal Care Products: A Complete Guide to Product Development", AOCS press, Champaign 2000, pp 122-137.

Dispersants—The cleaning compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms. The inventors have discovered that the a combination of conjugated and unconjugated polymers may be especially useful as the two components can be balanced to provide preferred levels of deposition of the polymer-dye conjugate and/or in order to provide whiteness maintenance through reduced soil deposition. Thus in one aspect of the invention, compositions of the present invention may comprise a dispersant polymer selected from the group consisting of cellulose ethers such as carboxymethyl cellulose including salts thereof such as sodium salt, methyl cellulose, hydroxyalkylcelluloses such as hydroxyl ethyl cellulose, and mixed ethers such as methyl hydroxyethylcellulose, methyl hydroxypropylcellulose, methyl carboxymethyl cellulose; phosphorylated celluloses such as those disclosed in WO 99/09124; cellulose, cationic starch, guar gum, uncharged starch, and mixtures thereof. Such dispersant polymer may be wholly or partially provided as a separate ingredient or may be wholly or partially provided in the form of unconjugated polymer in the dye conjugate reaction mixture. Amounts of dispersant polymer based on total cleaning composition weight may include from about 0.05% to about 10%, from about 0.1 to about 5% or even from about 0.1% to about 2%.

Enzymes—The cleaning compositions can comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise a protease, lipase, cutinase and/or cellulase in conjunction with amylase.

When present in a cleaning composition, the aforementioned adjunct enzymes may be present at levels from about 0.00001% to about 2%, from about 0.0001% to about 1% or even from about 0.001% to about 0.5% enzyme protein by weight of the composition.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor can be added to further improve stability.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430, 243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. No. 5,597,936; U.S. Pat. No. 5,595,967. Such cobalt catalysts are readily prepared by known procedures, such as taught for example in U.S. Pat. No. 5,597,936, and U.S. Pat. No. 5,595,967.

Compositions herein may also suitably include a transition metal complex of a macropolycyclic rigid ligand—abbreviated as "MRL". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRL's include 5,12-diethyl-1,5,8,12-tetraazabicyclo[6.6.]hexadecane.

Suitable transition metal MRLs are readily prepared by known procedures, such as taught for example in WO 00/32601, and U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

Processes of Making Cleaning and/or Treatment Compositions

The cleaning compositions of the present invention can be formulated into any suitable form and prepared by any process chosen by the formulator, non-limiting examples of which are described in Applicants examples and in U.S. Pat. No. 5,879,584; U.S. Pat. No. 5,691,297; U.S. Pat. No. 5,574, 005; U.S. Pat. No. 5,569,645; U.S. Pat. No. 5,565,422; U.S. Pat. No. 5,516,448; U.S. Pat. No. 5,489,392; U.S. Pat. No. 5,486,303 all of which are incorporated herein by reference. In one aspect of the invention the dye conjugate is incorporated into the cleaning compositions of the present invention as a solid particle having a particle size such that no more than 10 wt %, no more than 5 wt % or even no more than 1 wt % of the dye conjugate has a particle size greater than 600, 500, 450, 350 or even 300 microns.

Method of Use

The cleaning and/or treatment compositions of the present invention can be used to clean and/or treat a situs inter alia a surface or fabric. Typically at least a portion of the situs is contacted with an embodiment of Applicants' composition, in neat form or diluted in a wash liquor, and then the situs is optionally washed and/or rinsed. For purposes of the present invention, washing includes but is not limited to, scrubbing, and mechanical agitation. The fabric may comprise any fabric capable of being laundered in normal consumer use conditions. Cleaning solutions that comprise the disclosed cleaning compositions typically have a pH of from about 5 to about 10.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric mass ratio is typically from about 1:1 to about 100:1.

EXAMPLES

Example 1

Synthesis of Remazol Blue or Lanasol Violet linked to CMC 50 grams of O-(carboxymethyl) cellulose is added to 1 liter of water, having a temperature of 50° C., containing 100 mg of Sigma crude cellulase preparation (Sigma C7502) and is stirred with a spatula to give a thick paste. The pH is checked and, if necessary, adjusted to 4.5 by addition of 1M HCl. The solution temperature is maintained at 50° C. for 30 minutes. The solution is blended vigorously to remove any lumps and then treated with 100 grams of anhydrous sodium sulphate, 10 grams of Remazol Brilliant Blue R ("RBB") or Lanasol Violet, and 10 grams of trisodium phosphate and the temperature is raised to 70° C. The solution is stirred and maintained at 70° C. on a hotplate magnetic stirrer for 2 hours. While still hot, the solution is treated with 1.5 volumes of ethanol to precipitate the dyed polysaccharide which is then recovered on a nylon screen and excess liquid removed by squeezing. This material is redissolved in hot water by homogenizing in a blender and then recovered by precipitation with 1.5 volumes ethanol. This process is repeated until the washings are essentially colourless. The polysaccharide is then dissolved in 2 liters of water and dialyzed against flowing tap water for 16 hours. The polysaccharide is precipitated from solution by the addition of 2 volumes ethanol and a sufficient volume of 1M KCl to induce precipitation of the dye polymer conjugate. The resulting dye polymer conjugate is collected on a nylon screen and dried by solvent exchange with ethanol and acetone and is dried in vacuo: the yield is 45 grams: RBB linked to CMC. The resulting dye polymer conjugate is analyzed and found to have a weight average molecular weight of approximately 80,000 Daltons, a degree of ether substitution of approximately 0.4 and a dye substitution ratio of approximately 1:22.

Example 2

Synthesis of Remazol Blue linked to Non-enzymatically Degraded CMC

The procedure for Example 1 is repeated but omitting the cellulose enzymatic treatment step.

Example 3

Alternative Preparation of the Dye Conjugate Between Carboxymethylcellulose and the Dyes Respectively Drimarene ex Clariant, Remazol Brilliant Blue and Procion Blue HB 50 ml of CMC-4 solution, prepared as described above, is warmed to 50° C. and 0.1418 gram of sodium hydroxide is added to compensate for the buffer. Next, 1 gram of anhydrous sodium sulfate is added. After complete dissolution, $1.6\times10^{-4}$ mole of dye and 0.1 g of trisodium phosphate are added and the temperature is raised to 70° C. The solution is kept at this temperature and stirred for 2 hours. While still hot, the solution is treated with 1.5 volumes of ethanol (75 ml) to precipitate the dyed polysaccharide. This solution is cooled in an ice-bath, while stirring. The precipitate is then collected through filtration on a glass filter and washed with a $1/1.5$ v/v solution of water/ethanol. In order to purify the dye-functionalized polysaccharide, the residue is dissolved in approximately 30-40 ml water and warmed to 60-70° C. The remaining ethanol is removed under vacuum, and the solution is stirred until complete dissolution occurs. Then, the hot solution treated with 1.5 volumes of ethanol, cooled in an ice bath while stirring, and the precipitate is isolated through filtration. This procedure is repeated until the filtrate is colourless. The wet functionalized polysaccharide is eventually completely dried under vacuum.

Example 4

Preparation of a Dye Conjugate Between Carboxymethylcellulose and the C.I. Reactive Black 5

The C.I. Reactive Black 5 dye conjugate is made in accordance with the procedure described in Example 3, except C.I. Reactive Black 5 dye is substituted for the Drimarene ex Clariant, Remazol Brilliant Blue and Procion Blue HB dyes.

Example 5

Synthesis of Remazol Blue Linked to CMC Starting From Cellulose Powder

Birch cellulose powder (10 g) is dyed in a dye bath containing Reactive Blue 19 (20 mL 20%), sodium chloride (100 mL, 200 g/L), trisodium phosphate (40 mL, 50 g/L), and water (40 mL). The dye bath is heated to 50° C. for 60 min and then cooled to room temperature. The dye bath is neutralized to a pH of 6 and the contents collected by filtration. The dyed cellulose is wash repeatedly with warm water (95° C.) washings (pH 6) until the washings are colorless. The resulting dyed cellulose is treated with chloroacetic acid to produced dyed carboxymethylcellulose using procedures described in U.S. Pat. No. 3,284,441. The resulting product can be used as is or treated with cellulose as described in Example 1.

Example 6

Preparation of a Clay-Dye Conjugate Suspension

A homogeneous suspension of Quest bentonite is made by mixing, for an hour, 25 grams of clay powder with 5 liters of distilled water. A dye solution comprising 0.25 grams of Basic Violet V3 C.I. 42555 dye in 2 liters of water is made and such solution is added to the clay suspension over a five hour period with continued mixing during the addition of the dye solution. The resulting dye/clay/water mixture is then mixed for another 48 hours. After 48 hours the mixture is centrifuged and the supernatant is decanted. A washing step wherein the clay/dye precipitate is re-suspended in 2 liters of distilled water and centrifuged and the supernatant is decanted is conducted. The re-suspension/centrifugation step is repeated one more time. The resulting dye clay conjugate may be added as a suspension to a liquid cleaning or treatment composition or the suspension can be dried and milled to obtain a powder.

The powder can be added to a cleaning or treatment composition or it can be used to make an agglomerate that can be added to such compositions.

Example 7

Preparation of a Clay-Dye Conjugate Suspension

The process of Example 6 is carried out except that dye solution is added to the clay suspension over a two hour period, the subsequent mixing is conducted for 24 hours and the washing step is conducted five times.

Example 8

Preparation of a Granulated Clay-Dye Conjugate 32 kg of Quest bentonite clay having a cation exchange capacity of greater than 50 meq/100 g is added to a Loedige™ agglomerator and 4 liters of water containing 140 grams of Basic blue B9 C.I. 52015 is slowly sprayed onto the clay powder. The resulting mixture is dried to a point where the mixture contains approximately 15% moisture by weight and then such mixture is sieved to a point such that at least 75% of the mixture remains on a 65 mesh sieve and at least 75% of the mixture passes through a 20 mesh sieve. The resulting sieved clay-dye conjugate agglomerates can be added to a cleaning or treatment composition.

Example 9

Preparation of a Black Clay-Dye Conjugate Suspension

The process of Example 8 is carried out except that dye solution comprises C.I. Basic Black 2.

In following detergent compositions, enzymes levels are given as percent pure enzyme per 100 grams total composition. Unless stated otherwise, the balance of the compositions of Examples 10-15 are water and minors such as perfume, suds suppressors etc. Abbreviated component identifications for Examples 10-15 are as follows:

| | |
|---|---|
| LAS | Sodium linear $C_{11-13}$ alkyl benzene sulphonate. |
| CxyAS | Sodium $C_{1x}$-$C_{1y}$ alkyl sulfate. |
| CxyEzS | $C_{1x}$-$C_{1y}$ sodium alkyl sulfate condensed with an average of z moles of ethylene oxide. |
| CxEOy | Cx alcohol with an average of ethoxylation of y |
| QAS | $R_2 \cdot N + (CH_3)_2(C_2H_4OH)$ with $R_2 = C_{10}$-$C_{12}$ |
| Soap | Sodium linear alkyl carboxylate derived from a 80/20 mixture of tallow and coconut fatty acids. |
| Silicate | Amorphous Sodium Silicate ($SiO_2$:$Na_2O$ ratio = 1.6-3.2:1). |

-continued

| | |
|---|---|
| Zeolite A | Hydrated Sodium Aluminosilicate of formula $Na_{12}(AlO_2SiO_2)_{12}$. $27H_2O$ having a primary particle size in the range from 0.1 to 10 micrometers (Weight expressed on an anhydrous basis). |
| (Na-)SKS-6 | Crystalline layered silicate of formula $\underline{\delta}$-$Na_2Si_2O_5$. |
| Citrate | Tri-sodium citrate dihydrate. |
| Citric | Anhydrous citric acid. |
| Carbonate | Anhydrous sodium carbonate. |
| Sulphate | Anhydrous sodium sulphate. |
| MA/AA | Random copolymer of 4:1 acrylate/maleate, average molecular weight about 70,000-80,000. |
| AA polymer | Sodium polyacrylate polymer of average molecular weight 4,500. |
| PB1/PB4 | Anhydrous sodium perborate monohydrate/tetrahydrate. |
| PC3 | Anhydrous sodium percarbonate [2.74 $Na_2CO_3 \cdot 3H_2O_2$] |
| TAED | Tetraacetyl ethylene diamine. |
| NOBS | Nonanoyloxybenzene sulfonate in the form of the sodium salt. |
| DTPA | Diethylene triamine pentaacetic acid. |
| HEDP | Hydroxyethane di phosphonate |
| HEDMP | Hydroxyethane di (methylene) phosphonate |
| DETPMP | Diethyltriamine penta (methylene) phosphonate |
| EDDS | Na salt of Ethylenediamine-N,N'-disuccinic acid, (S,S) isomer |
| Protease | Proteolytic enzyme sold under the tradename Savinase ®, Alcalase ®, Everlase ®, by Novozymes A/S, Properase ®, Purafect ®, Purafect MA ® and Purafect Ox ® sold by Genencor and proteases described in patents WO 91/06637 and/or WO 95/10591 and/or EP 0 251 446. |
| Amylase | Amylolytic enzyme sold under the tradename Purastar ®, Purafect Oxam ® sold by Genencor; Termamyl ®, Fungamyl ® Duramyl ®, Stainzyme ® and Natalase ® sold by Novozymes A/S. |
| Lipase | Lipolytic enzyme sold under the tradename Lipolase ® Lipolase Ultra ® by Novozymes A/S. |
| Cellulase | Cellulytic enzyme sold under the tradename Carezyme ®, Celluzyme ® and/or Endolase ® by Novozymes A/S or a Glucanase enzyme |
| Pectate Lyase | Pectawash ®, Pectaway ® sold by Novozymes |
| Mannanase | Mannaway ® sold by Novozymes |
| CMC or HEC or EMC | Carboxymethyl or Hydroxyethyl or ester modified cellulose. |
| SS Agglom. | 12% Silicone/silica, 18% stearyl alcohol, 70% starch in granular form [suds suppressor agglomerate]. |
| TEPAE | Tetreaethylenepentaamine ethoxylate. |
| Photobleach | Sulfonated zinc phtalocyanine |
| CMC-Violet | Dye polymer conjugate of Example 1 |
| CMC-Black | Dye polymer conjugate of Example 4 |
| Cellulose-Blue | Drimarene Brilliant Blue Cellulose conjugate purchased from Megazyme |
| Amylose-Blue | Remazol Brilliant Blue Amylose conjugate purchased from Aldrich Co. |
| Casein-Blue | Sulphanilic Acid Casein conjugate purchased from Megazyme |
| CMC-Blue | Dye polymer conjugate of Example 1 |
| pH | Measured as a 1% solution in distilled water at 20° C. |

Example 10

Bleaching High Duty Laundry Detergent Compositions are Prepared

| | I | II | III | IV | V | VI | VII | VIII |
|---|---|---|---|---|---|---|---|---|
| Blown Powder | | | | | | | | |
| Zeolite A | 13.65 | 13.65 | — | — | — | — | — | — |
| Na Sulfate | 22.67 | 22.67 | 24.43 | 30.13 | — | — | — | — |
| LAS | 6.21 | 6.21 | 5.65 | — | — | — | — | — |
| QAS | — | — | — | 2.95 | — | — | — | — |
| MA/AA | 1.42 | 1.42 | 3.50 | 4.25 | — | — | — | — |

-continued

| | I | II | III | IV | V | VI | VII | VIII |
|---|---|---|---|---|---|---|---|---|
| EDDS | 0.19 | 0.19 | 0.19 | 0.23 | — | — | — | — |
| Brightener | 0.07 | 0.07 | 0.06 | 0.08 | — | — | — | — |
| Mg Sulfate | 0.65 | 0.65 | 0.39 | 0.48 | — | — | — | — |
| HEDMP | 0.17 | 0.17 | 0.17 | 0.21 | — | — | — | — |
| Agglomerate 1 | | | | | | | | |
| QAS | — | — | 0.9 | — | — | — | — | — |
| Carbonate | — | — | 2.45 | — | — | — | — | — |
| Na Sulfate | — | — | 2.45 | — | — | — | — | — |
| Agglomerate 2 | | | | | | | | |
| $C_{14\text{-}15}EO_7$ | — | — | 2.79 | 2.21 | — | — | — | — |
| Na Sulfate | — | — | 6.65 | 6.84 | — | — | — | — |
| Agglomerate 3 | | | | | | | | |
| LAS | — | — | — | — | 13.63 | 14.96 | — | 13.63 |
| Zeolite A | — | — | — | — | 21.42 | 23.51 | — | 21.42 |
| Agglomerate 4 | | | | | | | | |
| LAS | — | — | — | — | — | — | 8.12 | — |
| Na Sulfate | — | — | — | — | — | — | 23.54 | — |
| Na Carbonate | — | — | — | — | — | — | 8.12 | — |
| Dry additives | | | | | | | | |
| LAS | — | — | 6.40 | — | — | — | — | — |
| MA/AA (particle) | — | — | 0.89 | 0.89 | 0.95 | 0.95 | 0.99 | 0.95 |
| TAED | 3.58 | 3.58 | 3.80 | 2.70 | 5.89 | 5.89 | 6.14 | — |
| NOBS | — | — | — | — | 13 | — | — | 5.50 |
| LAS (flakes) | — | — | — | 27.0 | — | — | — | — |
| Silicate R 2.0 | 3.85 | 3.85 | 3.85 | 2.80 | — | — | — | — |
| Citric/Citrate | 3.58 | 3.58 | 3.58 | 3.58 | 3.80 | 3.80 | 3.96 | 3.80 |
| Na Carbonate | 7.72 | 7.72 | 13.84 | — | 12.35 | — | 12.87 | 12.35 |
| HEDP | — | — | — | — | 0.48 | 0.48 | 0.50 | 0.48 |
| PC3 or PB1 | 11.01 | 11.01 | 11.01 | 8.00 | 8.55 | 8.55 | 8.91 | 8.55 |
| Protease | 0.009 | 0.009 | 0.009 | 0.009 | 0.039 | 0.039 | 0.039 | 0.039 |
| Amylase | 0.005 | 0.005 | 0.005 | 0.005 | 0.013 | 0.013 | 0.013 | 0.013 |
| Lipase | — | — | — | — | 0.002 | 0.002 | 0.002 | 0.002 |
| Pectate lyase | — | — | — | — | 0.003 | 0.003 | 0.003 | 0.003 |
| Cellulase | 0.003 | — | 0.001 | — | 0.0005 | — | — | — |
| SS agglom. | 0.36 | 0.36 | 0.36 | 0.55 | 0.62 | 0.62 | 0.64 | 0.62 |
| Soap | 0.40 | 0.40 | 0.40 | 0.40 | 0.48 | 0.48 | 0.50 | 0.48 |
| Brightener | — | — | — | — | 0.10 | 0.10 | 0.10 | 0.10 |
| Na Sulfate | 4.48 | 4.48 | — | — | 14.30 | 22.85 | 14.90 | 14.30 |
| Spray-on | | | | | | | | |
| $C_{12\text{-}14}EO_7$ | 4.00 | 4.00 | — | — | 3.00 | 3.00 | 1.00 | 3.00 |
| Dusting | | | | | | | | |
| Zeolite A | — | — | — | — | 2.00 | 2.00 | — | 2.00 |
| CMC-Blue | 0.0125 | 0.00625 | 0.125 | | 0.005 | 0.01 | 0.01 | 0.5 |
| Amylose-Blue | 0.0125 | — | | | | | | |
| CMC-Violet | 0.0125 | — | | 0.125 | | | | |
| Density (g/L) | 600 | 600 | 600 | 600 | 800 | 800 | 800 | 800 |

Example 11

The following laundry compositions, which can be in the form of granules or tablet, are prepared according to the present invention.

| Base Product | I | II | III | IV | V |
|---|---|---|---|---|---|
| $C_{14}$-$C_{15}$ AS/Tallow AS | 8.0 | 5.0 | 3.0 | 3.0 | 3.0 |
| LAS | 8.0 | — | 8.0 | — | 7.0 |
| $C_{12}C_{15}AE_3S$ | 0.5 | 2.0 | 1.0 | — | — |
| $C_{12}C_{15}AE_5/AE_3$ | 2.0 | — | 5.0 | 2.0 | 2.0 |
| QAS | — | — | — | 1.0 | 1.0 |
| Zeolite A | 20.0 | 18.0 | 11.0 | — | 10.0 |
| (Na–)SKS-6 (I) (dry add) | — | — | 9.0 | — | — |
| MA/AA | 2.0 | 2.0 | 2.0 | — | — |

-continued

| Base Product | I | II | III | IV | V |
|---|---|---|---|---|---|
| AA polymer | — | — | — | — | 4.0 |
| Citrate | — | 2.0 | — | — | — |
| Citric | 2.0 | — | 1.5 | 2.0 | — |
| DTPA | 0.2 | 0.2 | — | — | — |
| EDDS | — | — | 0.5 | 0.1 | — |
| HEDP | — | — | 0.2 | 0.1 | — |
| PB1 | 3.0 | 5.0 | 10.0 | — | 4.0 |
| Percarbonate | — | — | — | 18.0 | — |
| NOBS | 3.0 | 4.0 | — | — | 4.0 |
| TAED | — | — | 2.0 | 5.0 | — |
| Carbonate | 15.0 | 18.0 | 8.0 | 15.0 | 15.0 |
| Sulphate | 5.0 | 12.0 | 2.0 | 17.0 | 3.0 |
| Silicate | — | 1.0 | — | — | 8.0 |

-continued

| Base Product | I | II | III | IV | V |
|---|---|---|---|---|---|
| Amylose-Blue or CMC-black | 0.25 | 0.25 | 0.01 | 0.5 | 1 |
| Protease | 0.033 | 0.033 | 0.033 | 0.046 | 0.033 |
| Lipase | 0.008 | 0.008 | 0.008 | 0.008 | 0.006 |
| Amylase | 0.001 | 0.001 | 0.001 | 0.0014 | 0.001 |
| Cellulase | 0.0014 | 0.0014 | 0.0014 | 0.01 | — |

-continued

| | I | II | III | IV |
|---|---|---|---|---|
| CMC-Blue | 0.0125 | 0.0063 | 0.125 | |
| Amylose-Blue | 0.0125 | — | | — |
| CMC-Violet | 0.0125 | — | | — |
| Protease | 0.011 | 0.009 | 0.009 | 0.009 |
| Amylase | 0.002 | 0.001 | 0.001 | 0.001 |
| Cellulase | — | 0.0006 | 0.0006 | 0.0006 |
| Na Carbonate | 25.0 | 29.68 | 30.52 | 28.30 |
| Magnesium Sulfate | 0.1 | 0.03 | 0.03 | 0.03 |
| Suds suppressor | 1.0 | 1.0 | 1.0 | 1.0 |
| EMC | — | 1.10 | 1.10 | 1.10 |

Example 12

The following granular detergents are prepared:

| | I | II | III | IV | V | VI | VII |
|---|---|---|---|---|---|---|---|
| LAS | 7.23 | 8.46 | 6.50 | 7.09 | 11.13 | 16.0 | 16.0 |
| QAS | 0.75 | — | 0.60 | 0.60 | 1.00 | — | — |
| $C_{14-15}EO_7$ | 3.50 | 5.17 | 3.50 | 3.70 | 3.50 | — | — |
| $C_{12-14}AE_3S$ | 0.25 | — | — | — | — | 0.70 | 1.0 |
| $C_{12-14}$—$N^+(CH_3)_2(C_2H_4OH)$ | — | — | — | — | — | 0.50 | 0.50 |
| Na tripolyphosphate | 18.62 | 25.00 | 18.62 | 24.00 | 45.00 | 15.0 | 18.0 |
| Zeolite A | — | — | 0.79 | — | — | 0.18 | 0.3 |
| Citric acid | 1.29 | — | 1.29 | — | — | — | — |
| Sodium Silicate | 3.10 | 8.00 | 4.26 | 3.87 | 10.00 | 8.0 | 6.0 |
| Sodium Carbonate | 18.04 | 11.00 | 18.04 | 18.98 | 0.42 | 14..5 | 16.0 |
| Sulfate | 17.58 | 3.98 | 19.93 | 15.48 | 10.13 | 30.0 | 30.0 |
| CMC | — | — | — | — | — | 0.20 | 0.20 |
| AA/MA | 2.15 | 1.50 | 1.85 | 1.60 | 1.94 | 0.1 | 0.05 |
| AA polymer | — | — | — | — | — | — | 1.20 |
| Amine ethoxylate polymer | 0.60 | — | 0.49 | — | — | — | 1.25 |
| Cyclic polyamine polymer | 0.07 | — | 0.07 | — | — | — | — |
| Percarbonate | 13.15 | — | 10.77 | — | — | — | — |
| PB1/PB4 | — | 9.0/9.0 | — | 10.45/0 | 2.37/0 | — | — |
| TAED | 2.50 | 5.00 | 1.58 | 1.52 | 0.66 | — | — |
| DTPA | 0.34 | 0.34 | 0.37 | 0.39 | 0.24 | 0.30 | 0.30 |
| Mg Sulfate | 1.37 | 1.43 | 1.37 | 1.41 | 0.58 | — | — |
| Protease | 0.005 | 0.011 | 0.006 | — | — | 0.006 | 0.003 |
| Amylase | 0.001 | 0.003 | 0.001 | 0.001 | — | — | 0.001 |
| Cellulase | 0.0003 | 0.0002 | 0.0003 | 0.0003 | — | — | — |
| Brightener | 0.10 | 0.17 | 0.08 | 0.08 | 0.08 | 0.23 | 0.15 |
| CMC Blue or CMC Black | 0.001 | 0.1 | 0.001 | 0.25 | 0.125 | 0.001 | 0.125 |

Example 13

The following granular fabric detergent compositions which provide "softening through the wash" are prepared:

| | I | II | III | IV |
|---|---|---|---|---|
| $C_{12-15}AS$ | 0.3 | 3.43 | 2.52 | 1.05 |
| LAS | 11.0 | 5.3 | 6.55 | 7.81 |
| $C_{12-14}AE_3S$ | — | 0.74 | 0.33 | — |
| LAS (mid branched) | — | — | 1.71 | 1.37 |
| $C_{14-15}EO_7$ | — | 2.00 | 2.00 | 2.00 |
| QAS | — | 1.57 | 1.20 | 1.35 |
| Citric acid | 2.5 | 1.28 | 1.28 | 1.28 |
| (Na–)SKS-6 | 4.0 | 4.71 | 4.96 | 4.71 |
| Zeolite A | 12.0 | 13.51 | 11.31 | 15.6 |
| Percarbonate | 6.5 | 9.03 | 9.03 | 10.3 |
| TAED | 1.5 | 2.48 | 2.48 | 3.22 |
| EDDS | 0.1 | 0.1 | 0.1 | 0.1 |
| HEDP | 1.2 | 0.20 | 0.20 | 0.20 |
| Smectite clay | 10.0 | — | 13.84 | — |
| Dye/clay conj. of Example #7 or 8 | — | 10.00 | — | 5.0 |
| Polyethylene oxide (MW approx. 300,000) | 0.2 | 0.22 | 0.22 | — |

-continued

| | I | II | III | IV |
|---|---|---|---|---|
| HEC | 0.8 | — | — | — |
| Sodium sulfate | 18.0 | balance | balance | balance |

Example 14

The following liquid detergent formulations are prepared:

| | I | II | III | IV | V | VI |
|---|---|---|---|---|---|---|
| LAS | 7.8 | 12.2 | 4.4 | 12.2 | 5.7 | 1.3 |
| Sodium alkyl ether sulfate | — | — | 14.4 | — | 9.2 | 5.4 |
| Alkyl ethoxylate | 5.7 | 8.8 | 2.2 | 8.8 | 8.1 | 3.4 |
| Amineoxide | 1.0 | 1.5 | 0.7 | 1.5 | — | — |
| Fatty acid | 5.3 | 8.3 | 3.0 | 8.3 | — | — |
| Citric acid (50%) | 1.1 | 6.8 | 2.0 | 3.4 | 1.9 | 1.0 |
| Ca and Na formate | — | — | 0.2 | — | — | — |

-continued

| | I | II | III | IV | V | VI |
|---|---|---|---|---|---|---|
| Na cumene sulphonate | 0.8 | 2 | — | 2.0 | — | — |
| Borate | — | — | 1.5 | 2.4 | 2.9 | — |
| MEA borate | 1.5 | 2.4 | — | — | — | — |
| Na hydroxide | 3.2 | 3.2 | 3.0 | 4.9 | 1.9 | 1.0 |
| Ethanol | 1.4 | 1.4 | 2.5 | 1.4 | 1.5 | — |
| 1,2 Propanediol | 4.9 | 5.0 | 6.6 | 4.9 | 4.0 | — |
| Sorbitol | — | — | — | — | 4.0 | — |
| Ethanolamine | 0.5 | 0.8 | 1.5 | 0.8 | 0.1 | — |
| TEPAE | 0.4 | 0.4 | | | | |
| CMC-Blue | 0.5 | 0.25 | 0.125 | 0.063 | 0.03 | |
| Cellulose-Blue | | | | | 0.03 | 0.1 |
| Protease | 0.02 | 0.028 | 0.04 | 0.028 | 0.04 | — |
| Lipase | — | — | — | — | 0.002 | — |
| Amylase | 0.001 | 0.002 | 0.0002 | 0.01 | — | — |
| PVNO | — | — | | | | |
| Brightener | 0.1 | 0.14 | 0.15 | 0.2 | 0.12 | 0.12 |
| Silicone antifoam | — | — | — | 0.05 | — | — |
| Mannanase | 0.0004 | 0.0006 | — | — | — | — |
| Cellulase | 0.0003 | 0.0002 | 0.0003 | — | — | — |
| Amine ethoxylate polymer | 0.8 | 1.3 | 1.8 | 2.1 | — | — |
| AA or MA/AA | — | — | — | — | 0.6 | 0.2 |
| DTPMP, DTPA, EDTA mixture | 0.3 | 0.3 | 0.1 | — | — | 0.1 |

Example 15

The following concentrated/dilute liquid fabric softening compositions are prepared.

| Ingredients | 1 | 2 |
|---|---|---|
| Softener Active: Rewoquat V3682 from Goldschmidt | 17.61 | 5.2 |
| Silicone: Antifoaming agent: MP10 from Dow Corning | 0.01 | 0.004 |
| HEDP (Sodium salt) | 0.17 | — |
| HCl | 0.005 | 0.013 |
| SRP: Texcare 3639 from Clariant | 0.05 | — |
| $CaCl_2$ | 0.035 | — |
| Stabilizer: PEG-4K Pluriol E4050E | 0.50 | — |
| Preservative: gluteraldehyde 50% - from BASF | — | 0.025 |
| Perfume | 0.80 | 0.32 |
| Dye | 0.003 | 0.0006 |
| CMC Blue | 0.001 | 0.1 |
| Demineralized water | Bal. | Bal. |

Example 16

The compositions of Examples 10-15 are used as follows: Each composition is combined with separate aliquots of solvent to result in separate solutions comprising from about 500 ppm to about 15,000 ppm of the respective composition. Articles, including white or black garments or hard surfaces, are contacted with the respective solution (the respective solution is selected based on the articles' initial color). When the article is a garment, the solvent to fabric mass ratio is from about 1:1 to about 100:1 and the solution temperature is from about 5° C. to about 90° C. Then the article is optionally washed and/or rinsed. The resulting articles' color is improved and/or maintained.

What is claimed is:

1. A cleaning and/or treatment composition comprising at least 0.0001 weight percent of a dye polymer conjugate, said dye and said polymer of said conjugate being chemically bound to each other, said polymer being selected from the group consisting of carboxymethyl cellulose, cellulose, cationic starch, guar gum, uncharged starch, hydroxyl ethyl cellulose, and combinations thereof and an optional stripping agent, the balance of said composition comprising one or more materials selected from the group consisting of builders hydrotropes, chelating agents, dye transfer inhibiting agents, enzymes, enzyme stabilizers, catalytic materials, bleach activators, hydrogen peroxide, sources of hydrogen peroxide, preformed peracids, clay soil removal/anti-redeposition agents, brighteners, structure elasticizing agents, fabric softeners and mixtures thereof.

2. A composition according to claim 1 said composition comprising from about 0.0001 to about 20 weight percent of said dye polymer.

3. A composition according to claim 2 wherein said dye polymer conjugate is selected from the group consisting of dye polymer conjugates comprising at least one reactive dye.

4. A composition according to claim 3 wherein said dye polymer conjugate is selected from the group consisting of dye polymer conjugates comprising at least one reactive dye selected from the group consisting of reactive dyes CI Reactive Yellow 1 through 213, CI Reactive Orange 1 through 139, CI Reactive Red 1 through 279, CI Reactive Violet 1 through 47, CI Reactive Blue 1 through 273, CI Reactive Green 1 through 33, CI Reactive Brown 1 through 50, CI Reactive Black 1 through 50 and mixtures thereof.

5. A composition according to claim 4 wherein said dye polymer conjugate is selected from the group consisting of dye polymer conjugates comprising at least one reactive dye selected from the group consisting of reactive dyes C.I. Reactive Violet 1, 2, 4, 5, 22, 46; C.I. Reactive Blue 2, 4, 5-8, 10, 13, 15, 19, 21, 27, 28, 36, 40, 49, 50, 69, 74, 81, 94, 109; C.I. Reactive Red 1-4, 6-9, 12, 13, 17, 22, 24, 33, 35, 41, 43, 45, 58, 66, 83, 84, 88, 92, 96, 120, 125; C.I. Reactive Green 1, 8, 19; C.I. Reactive Black 5, 39 and 45 and mixtures thereof.

6. A composition according to claim 5 wherein said dye polymer conjugate is selected from the group consisting of dye polymer conjugates comprising at least one dye selected from the group consisting of C.I. Reactive Blue 19, C.I. Reactive Blue 8, C.I. Reactive Blue 10, C.I. Reactive Blue 21, C.I. Reactive Blue 28, C.I. Reactive Violet 22, C.I. Reactive Green 1, C.I. Reactive Red 1; C.I. Reactive Black 5, and mixtures thereof.

7. A composition according to claim 6 wherein said dye polymer conjugate is selected from the group consisting of C.I. Reactive Blue 19 carboxymethyl cellulose conjugate, C.I. Reactive Blue 19 cellulose conjugate, C.I. Reactive Blue 19 cationic starch conjugate, C.I. Reactive Blue 8 carboxymethyl cellulose conjugate, C.I. Reactive Blue 10 carboxymethyl cellulose conjugate, C.I. Reactive Blue 21 carboxymethyl cellulose conjugate, C.I. Reactive Blue 28 carboxymethyl cellulose conjugate, C.I Reactive Blue 19 guar gum conjugate, C.I. Reactive Violet 22 carboxymethyl cellulose conjugate, C.I. Reactive Violet 22 uncharged starch conjugate, C.I Reactive Violet 22 cationic starch conjugate, C.I. Reactive Violet 22 guar gum conjugate, C.I Reactive Violet 22 hydroxylethyl cellulose conjugate, C.I. Reactive Green 1 carboxymethyl cellulose conjugate, C.I. Reactive Red 1 carboxymethyl cellulose conjugate, C.I. Reactive Red 1 uncharged starch, C.I. Reactive Black 5 carboxymethyl cellulose conjugate and mixtures thereof.

8. A composition according to claim 2 wherein said optional stripping agent is present at a level of at least 0.0001 weight percent and said optional stripping agent is selected from the group consisting of enzymes, zwitterionic polymer, nonionic surfactant, singlet oxygen generators, transition metal catalysts, per-acid/organic catalysts and mixtures thereof.

9. A composition according to claim 1 wherein said composition comprises one or more materials selected from the group consisting of builders hydrotropes, chelating agents, enzyme stabilizers, bleach activators, hydrogen peroxide, sources of hydrogen peroxide, preformed peracids, brighteners, structure elasticizing agents, fabric softeners and mixtures thereof.

10. A method of improving the whiteness perception of a situs, said method comprising contacting said situs with a composition according to claim 2, and then optionally washing and/or rinsing said surface.

11. A method of improving the blackness perception of a situs, said method comprising contacting said situs with a composition according to claim 2, and then optionally washing and/or rinsing said surface.

12. A composition according to claim 2 wherein a.) said polymer of said dye polymer conjugate comprises a cellulose ether having one or more of the following characteristics:

(i) a weight average molecular weight of from about 20,000 Daltons to about 180,000 Daltons;

(ii) a degree of ether substitution of from about 0.3 to about 1.2; and (iii) a dye substitution ratio of from about 1:10 to about 1:50;

b.) at least a portion of said dye conjugate is in the form of solid particles having a particle size such that no more than 10 wt % of said portion of said dye conjugate has a particle size greater than 600 microns; and c.) said balance of said composition comprises (i) a pre-formed peracid; a peracid formed in situ from the reaction of the hydrogen peroxide source and a bleach activator; and mixtures thereof (ii) a dispersant; and (iii) optionally, one or more materials selected from the group consisting of builders hydrotropes, chelating agents, dye transfer inhibiting agents, enzymes, enzyme stabilizers, catalytic materials, bleach activators, clay soil removal/anti-redeposition agents, brighteners, structure elasticizing agents, fabric softeners and mixtures thereof.

13. A cleaning and/or treatment composition comprising at least 0.0001 weight percent of a dye polymer conjugate, said dye and said polymer of said conjugate being chemically bound to each other, said dye polymer conjugate comprising a reactive dye, a polymer selected from the group consisting of polysaccharides, proteins, polyalkyleneimines, polyamides, polyols, and mixtures thereof, and an optional stripping agent, the balance of said composition comprising one or more materials selected from the group consisting of builders hydrotropes, chelating agents, dye transfer inhibiting agents, enzymes, enzyme stabilizers, catalytic materials, bleach activators, hydrogen peroxide, sources of hydrogen peroxide, preformed peracids, clay soil removal/anti-redeposition agents, brighteners, structure elasticizing agents, fabric softeners and mixtures thereof.

14. A composition according to claim 13 said composition comprising from about 0.0001 to about 20 weight percent of said dye polymer conjugate.

15. A composition according to claim 13 wherein said dye polymer conjugate is selected from the group consisting of dye polymer conjugates comprising at least one reactive dye selected from the group consisting of reactive dyes CI Reactive Yellow 1 through 213, CI Reactive Orange 1 through 139, CI Reactive Red 1 through 279, CI Reactive Violet 1 through 47, CI Reactive Blue 1 through 273, CI Reactive Green 1 through 33, CI Reactive Brown 1 through 50, CI Reactive Black 1 through 50 and a polymer selected from the group consisting of polysaccharides, proteins, polyalkyleneimines, polyamides, polyols, silicones and mixtures thereof.

16. A composition according to claim 15 wherein said dye polymer conjugate is selected from the group consisting of dye polymer conjugates comprising at least one reactive dye selected from the group consisting of reactive dyes C.I. Reactive Violet 1, 2, 4, 5, 22, 46; C.I. Reactive Blue 2, 4, 5-8, 10, 13, 15, 19, 21, 27, 28, 36, 40, 49, 50, 69, 74, 81, 94, 109; C.I. Reactive Red 1-4, 6-9, 12, 13, 17, 22, 24, 33, 35, 41, 43, 45, 58, 66, 83, 84, 88, 92, 96, 120, 125; C.I. Reactive Green 1, 8, 19; C.I. Reactive Black 5, 39 and 45 and a polymer selected from the group consisting of polysaccharides, proteins, polyalkyleneimines, polyamides, polyols, silicones and mixtures thereof.

17. A composition according to claim 16 wherein said dye polymer conjugate is selected from the group consisting of dye polymer conjugates comprising at least one dye selected from the group consisting of C.I. Reactive Blue 19, C.I. Reactive Blue 8, C.I. Reactive Blue 10, C.I. Reactive Blue 21, C.I. Reactive Blue 28, C.I. Reactive Violet 22, C.I. Reactive Green 1, C.I. Reactive Red 1; C.I. Reactive Black 5, and a polymer selected from the group consisting of carboxymethyl cellulose, cellulose, cationic starch, guar gum, uncharged starch, hydroxylethyl cellulose conjugate and mixtures thereof.

18. A composition according to claim 17 wherein said dye polymer conjugate is selected from the group consisting of C.I. Reactive Blue 19 carboxymethyl cellulose conjugate, C.I. Reactive Blue 19 cellulose conjugate, C.I. Reactive Blue 19 cationic starch conjugate, C.I. Reactive Blue 8 carboxymethyl cellulose conjugate, C.I. Reactive Blue 10 carboxymethyl cellulose conjugate, C.I. Reactive Blue 21 carboxymethyl cellulose conjugate, C.I. Reactive Blue 28 carboxymethyl cellulose conjugate, C.I Reactive Blue 19 guar gum conjugate, C.I. Reactive Violet 22 carboxymethyl cellulose conjugate, C.I. Reactive Violet 22 uncharged starch conjugate, C.I Reactive Violet 22 cationic starch conjugate, C.I. Reactive Violet 22 guar gum conjugate, C.I Reactive Violet 22 hydroxylethyl cellulose conjugate, C.I. Reactive Green 1 carboxymethyl cellulose conjugate, C.I. Reactive Red 1 carboxymethyl cellulose conjugate, C.I. Reactive Red 1 uncharged starch, C.I. Reactive Black 5 carboxymethyl cellulose conjugate and mixtures thereof.

19. A composition according to claim 14 wherein said optional stripping agent is present at a level of at least 0.0001 weight percent and said optional stripping agent is selected from the group consisting of enzymes, zwitterionic polymer, nonionic surfactant, singlet oxygen generators, transition metal catalysts, per-acid/organic catalysts and mixtures thereof.

20. A composition according to claim 13 wherein said composition comprises one or more materials selected from the group consisting of builders hydrotropes, chelating agents, enzyme stabilizers, bleach activators, hydrogen peroxide, sources of hydrogen peroxide, preformed peracids, brighteners, structure elasticizing agents, fabric softeners and mixtures thereof.

21. A method of improving the whiteness perception of a situs, said method comprising contacting said situs with a composition according to claim 14, and then optionally washing and/or rinsing said surface.

22. A method of improving the blackness perception of a situs, said method comprising contacting said situs with a composition according to claim 14, and then optionally washing and/or rinsing said surface.

23. A composition according to claim 14 wherein a.) said polymer of said dye polymer conjugate comprises a cellulose ether having one or more of the following characteristics:

(i) a weight average molecular weight of from about 20,000 Daltons to about 180,000 Daltons;

(ii) a degree of ether substitution of from about 0.3 to about 1.2; and (iii) a dye substitution ratio of from about 1:10 to about 1:50;

b.) at least a portion of said dye conjugate is in the form of solid particles having a particle size such that no more than 10 wt % of said portion of said dye conjugate has a particle size greater than 600 microns; and c.) said balance of said composition comprises (i) a pre-formed peracid; a peracid formed in situ from the reaction of the hydrogen peroxide source and a bleach activator; and mixtures thereof (ii) a dispersant; and (iii) optionally, one or more materials selected from the group consisting of builders hydrotropes, chelating agents, dye transfer inhibiting agents, enzymes, enzyme stabilizers, catalytic materials, bleach activators, clay soil removal/anti-redeposition agents, brighteners, structure elasticizing agents, fabric softeners and mixtures thereof.

* * * * *

UNITED STATES PATENT AND TRADEMARK OFFICE

CERTIFICATE OF CORRECTION

PATENT NO. : 7,846,268 B2
APPLICATION NO. : 12/697347
DATED : December 7, 2010
INVENTOR(S) : Johan Smets et al.

It is certified that error appears in the above-identified patent and that said Letters Patent is hereby corrected as shown below:

Column 10

Line 31, delete “[6.6.]” and insert --[6.6.2]--.

Column 15

Line 26, in the row titled NOBS, delete “13”.

Signed and Sealed this
Ninth Day of August, 2011

David J. Kappos
*Director of the United States Patent and Trademark Office*